(12) United States Patent
Kientz et al.

(10) Patent No.: US 8,824,083 B1
(45) Date of Patent: Sep. 2, 2014

(54) CALIBRATION SYSTEM FOR LIMITING TAPE HEAD ASSEMBLY POSITIONING ERRORS DURING DATA WRITING AND READING OF TAPE IN TAPE DRIVE

(71) Applicant: Oracle International Corporation, Redwood City, CA (US)

(72) Inventors: Steven M. Kientz, Broomfield, CO (US); Steven G. Trabert, Boulder, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/955,203

(22) Filed: Jul. 31, 2013

(51) Int. Cl.
*G11B 5/02* (2006.01)
*G11B 5/56* (2006.01)

(52) U.S. Cl.
CPC .................................... *G11B 5/56* (2013.01)
USPC .......... 360/55; 360/69; 360/77.12; 360/78.02

(58) Field of Classification Search
None
See application file for complete search history.

(56) References Cited

U.S. PATENT DOCUMENTS

| 5,675,448 A | 10/1997 | Molstad et al. |
| 6,430,008 B1 * | 8/2002 | Trabert et al. ................. 360/317 |
| 2011/0199702 A1 * | 8/2011 | Hoerger ..................... 360/77.12 |

* cited by examiner

*Primary Examiner* — Muhammad N Edun
(74) *Attorney, Agent, or Firm* — Marsh Fischmann & Breyfogle LLP; Jonathon A. Szumny

(57) ABSTRACT

Systems and methods (e.g., "utilities") of measuring errors in the positioning of tape head assembly data write and read elements of a tape drive and utilizing obtained calibration data to accurately align the data write elements with a desired position while writing data tracks and data read elements while reading previously written and aligned data tracks. The disclosed utilities independently determine a degree to which a tape drive write head is to be offset from a nominal write position of the write head over a tape and independently determine a degree to which a tape drive read head is to be offset from a nominal center position of previously written data track of the tape, each to collectively account for the various types of non-idealities in the write or read head of the tape drive (e.g., positioning errors between the data write/read elements and servo readers, etc.).

20 Claims, 8 Drawing Sheets

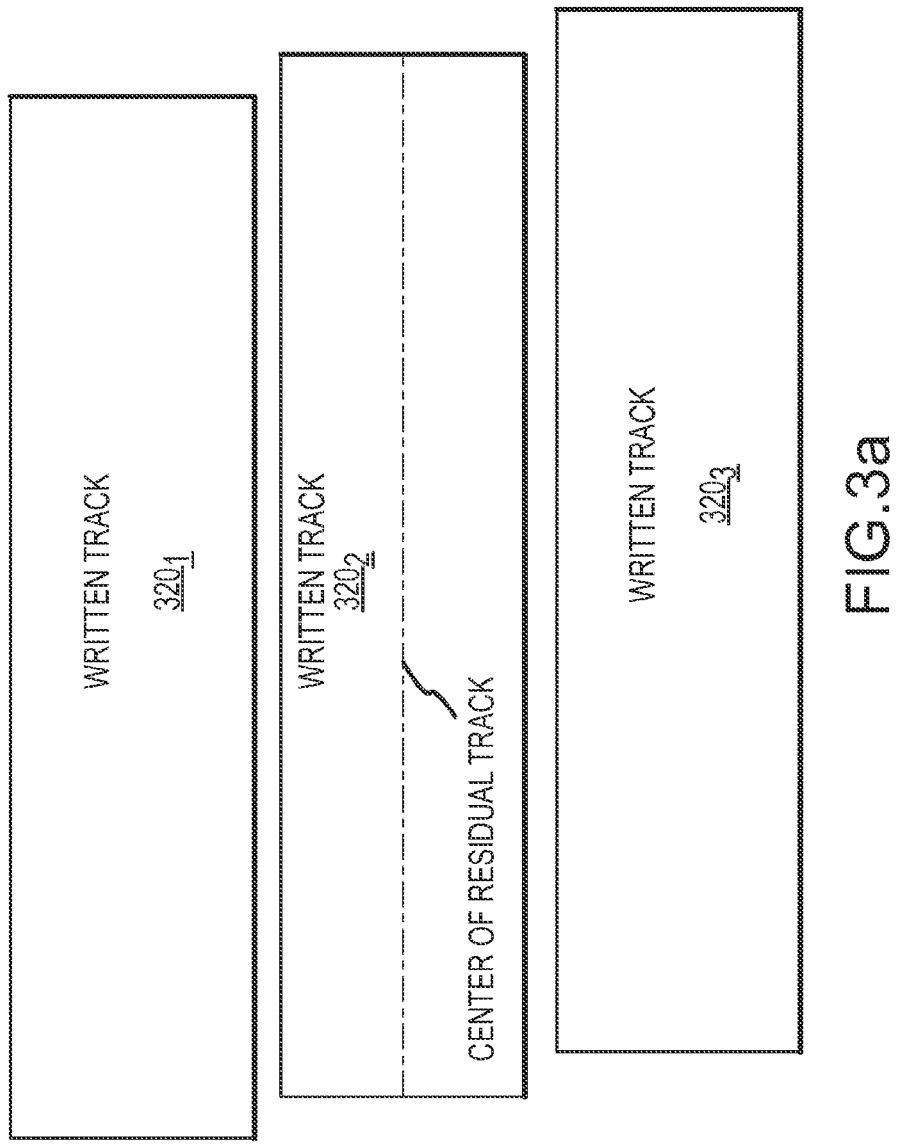

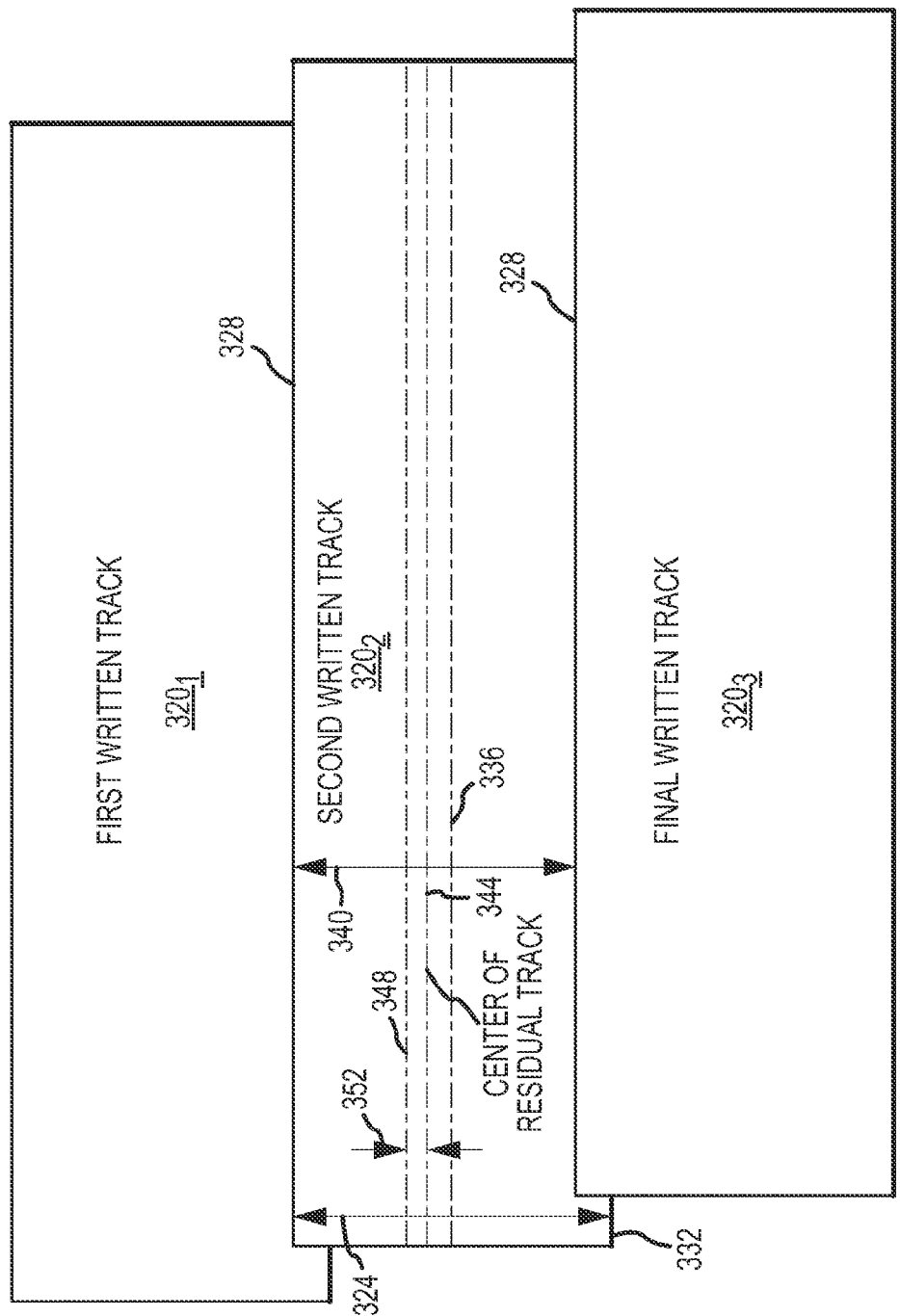

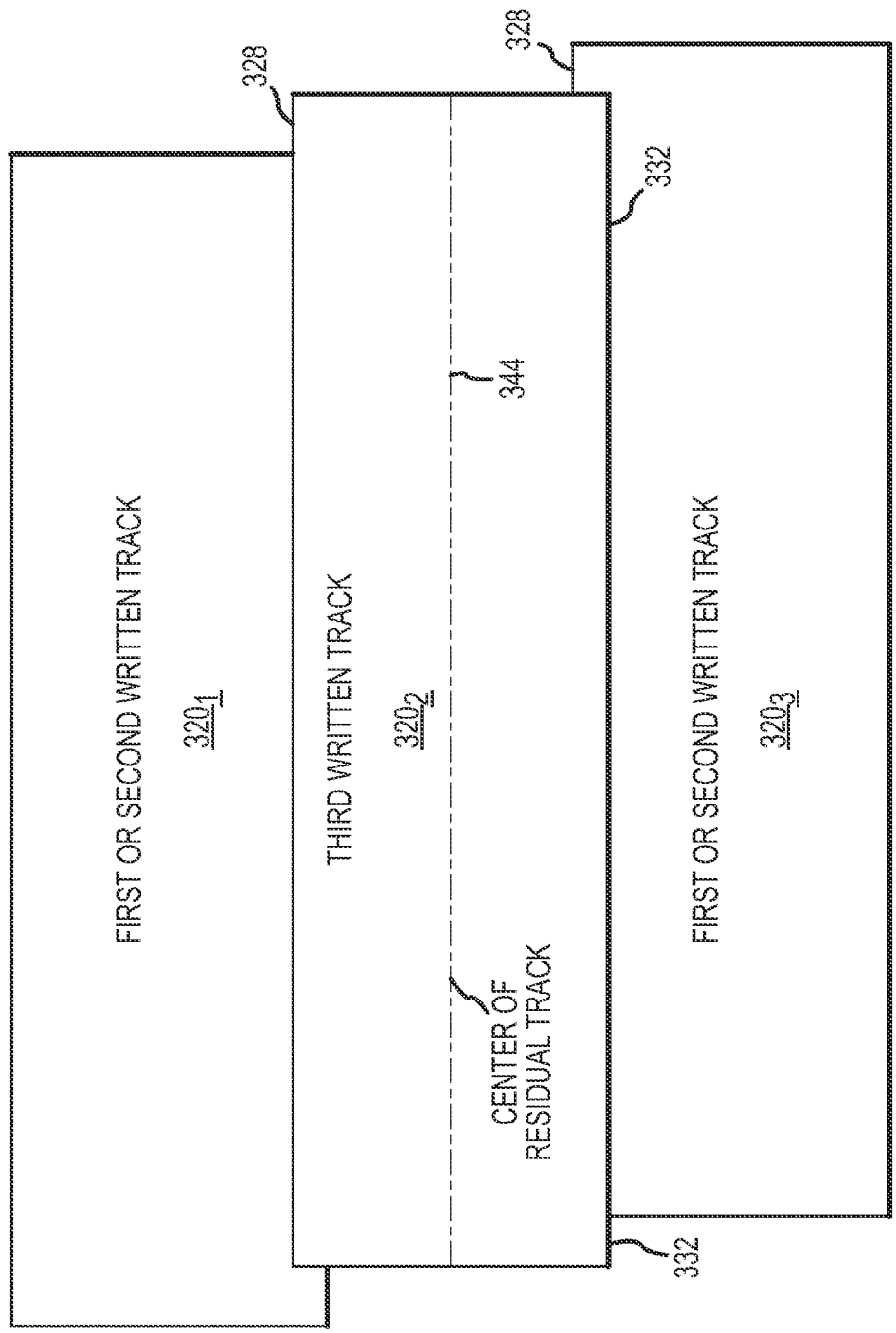

CALIBRATION SYSTEM FOR LIMITING TAPE HEAD ASSEMBLY POSITIONING ERRORS DURING DATA WRITING AND READING OF TAPE IN TAPE DRIVE

BACKGROUND

1. Field of the Invention

The present invention generally relates to the storing of data on magnetic tape media and, more particularly, to systems that calibrate positioning errors during read and write operations on a tape drive.

2. Relevant Background

The market for mass storage devices is growing at what seems to be an ever increasing rate with the sales of high-performance computers penetrating numerous industries ranging from financial institutions to oil exploration companies. The processing power of these high-performance systems, and the data they generate, are increasing faster than the ability of storage devices to keep pace. The problem of data storage and rapid retrieval is particularly pronounced in computational-intensive applications which create huge amounts of data that need to be accessed in seconds rather than minutes, hours or even days.

Magnetic disks remain the preferred media for direct access to frequently used files because of their fast access times. However, because of their high cost per-unit of storage and limited capacity, magnetic disk recorders are prohibitively expensive and therefore impractical for large-scale data storage. With the advances in magnetic tape technology, tape based systems remain the preferred choice for mass data storage. In addition to cost, magnetic tape exceeds the storage density of almost any other medium, at least from a volumetric standpoint, because tape is a much thinner medium than, for example, magnetic disks, and tape can be tightly packed.

Magnetic tape is a magnetic recording medium made of a thin magnetizable coating on a long, narrow strip of plastic which is typically stored in the form of a spool on a cartridge or cassette. Typically, multiple, parallel data tracks may be written to and/or read data from the tape in one of a number of manners. In "linear" or "longitudinal" reading or recording, data is read or recorded by moving from a starting point on the first track of the tape and moving linearly down the tape along the first track or along a first path. Once the physical end of the tape (EOT) is reached, the tape is rewound to the beginning of the tape (BOT) at which point the read/record head assembly begins reading or recording linearly down the tape along the second track or along a second path. In a variation of the linear method known as "serpentine" reading and recording, the head assembly first spans the tape's entire length in one direction along one track or path and then returns in the opposite direction along an adjacent parallel track or path (and then continues sweeping back and forth along the tape). In another variation of the linear method known as "spiral in" reading and recording, the head assembly first spans the tape's entire length in a first direction along a first track or path adjacent one outer lateral edge of the tape, returns in the opposite direction along a second track or path adjacent the other lateral edge of the tape, spans the tape in the first direction again along a third track or path adjacent the first track, and so on in a spiral manner around the tape.

Often, magnetic tape is pre-formatted with a plurality of guards (i.e., strips of the tape on which user data cannot be written) running either perpendicular to the tape length (to separate the tape into a number of sections or segments) or along the tape length (to separate the tape into a number of servo portions or data bands on which independent read/write heads can operate). A head assembly may often have a plurality of read/write heads (e.g., each including a plurality of read or write elements) that are operable to read and/or write (e.g., simultaneously) in one or more tracks in respective data bands. One or more tracks written at the same time along the tape length may be referred to as a "wrap." In this regard, a new wrap begins each time the head assembly begins reading or writing in the forward or reverse directions.

SUMMARY

In some arrangements, data tracks can be completely isolated from each other such that a space exists between adjacent tracks. In other arrangements, magnetic tape media can be "shingled" to increase the data density of magnetic tape in a manner that is generally free of significant changes to the structure of the underlying magnetic tape media and/or the head assemblies. Generally, shingling refers to the situation where one written track at least partially overlaps and overwrites an adjacent, previously written track. The portion of each written track not overlapped by an adjacent, subsequently written track may be referred to as an "actual" or "residual" track which can be read by the read head of the head assembly.

Variations of shingling include shingling tracks in a predictable manner, shingling tracks in a random order, shingling tracks from both sides (e.g., write a first track of interest and then write a pair of adjacent tracks on opposing sides of the first track (e.g., "double shingling")), and the like. In some situations, such as when a track of interest is the last track written, a track may not be shingled at all even when adjacent tracks are shingled. In any case, the width of the shingled residual track is thus smaller than that of the written track. Stated differently, the residual track pitch is smaller than the written track width. Shingling thus allows for the tighter placement and reduction in width of residual data tracks without requiring a reduction in the width of the elements on or of the head assembly. Variability in the write track width and the amount of expected shingle can cause the center of the residual track to be offset from the center of the full written track.

In any case, it becomes increasingly difficult to maintain alignment of the tape head assembly data elements with a desired position on the tracks during write and read operations as the track density increases. Servo patterns are often pre-recorded on tape in an effort to maintain proper alignment of the data elements. More specifically, one or more servo readers of the tape head assembly measure their position relative to the pre-recorded servo patterns during read/write operations and the position of the tape head assembly is continually adjusted based on the measured positions of the servo readers to maintain proper alignment of the data readers and writers of the tape head assembly over the written and read data tracks. However, non-idealities or inefficiencies in the servo readers, data writers and data readers often cause static errors in positioning of the data writers during writing and the data readers during reading.

One type of inefficiency has to do with errors (e.g., mask alignment errors) in the position of the servo readers relative to the data writers of the tape head assembly due to the physical positions of these components being defined on different mask layers. Another type of inefficiency relates to alignment errors between the servo readers and data readers (e.g., despite the servo and data readers often being defined on the same mask layer). Other types of inefficiencies include errors in the width of the data writers (e.g., which can cause shifts in the track centerline when shingling), errors between the magnetic and physical centerlines of the servo readers, and the like.

In this regard, disclosed herein are methods, systems, apparatuses (e.g., tape drives), and the like ("utilities") that measure errors in positioning tape head assembly data write and read elements in a calibration process (e.g., where the errors may be in manifested in the form of offsets of the write and read elements from substantially ideal/aligned positions over the tape or data tracks of the tape) and then utilize the obtained calibration data to accurately position the write elements while writing data tracks and data read elements while reading previously written and aligned data tracks. More specifically, the disclosed utilities serve to determine a degree to which a write head of a tape drive is to be offset (a "write head offset" or "write head offset value") from a "nominal" write position of the write head over a tape (e.g., a position at which a servo system of the tape drive naturally positions the write head during writing operations) to collectively account for the various types of non-idealities in the write head of the tape drive (e.g., errors in positioning between the data write elements and servo readers, errors in width of data write elements, etc.). The disclosed utilities also serve to determine a degree to which a read head of the tape drive is to be offset (a "read head offset" or "read head offset value") from a nominal center position of previously written data track of the tape (e.g., a position at which a servo system of the tape drive naturally positions the read head during reading operations) to collectively account for the various types of non-idealities in the read head of the tape drive (e.g., errors in positioning between the data read elements and servo readers, etc.). The write head offset may be implemented independently of the read head offset and vice versa (e.g., during subsequent writing and/or reading operations on magnetic tapes).

As an example, a reference or calibration tape may be written with a calibration tape drive, where the calibration drive is presumed to have little or substantially no write head offset (e.g., through experimentation, optical verification, etc.). A tape drive to be tested (a "test drive") may then be operated to read the written tracks of the calibration tape (again, which are presumed to be written substantially "ideally") for purposes of determining a read head offset of the read head of the test drive. For instance, the various read elements of the read head of the tape drive may be positioned over the nominal center positions of the various written data tracks (e.g., via an associated servo system and servo readers of the read head). A "bathtub" read test of the written tracks may then be performed by repeatedly reading each of the written data tracks by the respective read elements at positions farther and farther away from the nominal center positions until the outside "bathtub" edges of each written data track are identified, where the error metrics (e.g., block error rate (BLER), signal-to-noise ratio (SNR), raw amplitude, overwrite measurement, etc.) of each of the two bathtub edges exceed some upper limit. The actual center between the two bathtub edges can be identified and then the offset between the actual and nominal centers can be determined and equated to the read head offset value.

The test drive may then be used to write data tracks onto another tape (e.g., a second tape, a test tape, etc.) at nominal write positions in a manner that is free of any implemented head offsets (i.e., the test tape is written just as the test drive would normally write). After writing the data tracks onto the test tape, the read head of the test drive may then be used to read the written tracks of the test tape for purposes of determining a write head offset of the write head of the test drive (as opposed to for determining the read head offset as discussed above). For instance, the various read elements of the read head of the tape drive may be positioned over "corrected" center positions of the various written data tracks (e.g., via the associated servo system and servo readers of the read head), where the corrected center positions correspond to positions over the data tracks that are offset from the nominal center positions by the read head offset value (e.g., via appropriately adding or subtracting the read head offset value to or from the nominal center positions).

Again, a bathtub read test of the written tracks may then be performed by repeatedly reading each of the written data tracks by the respective read elements at positions farther and farther away from the corrected center positions until the outside "bathtub" edges of each written data track are identified, where the error metrics (e.g., block error rate (BLER)) each of the two bathtub edges exceed some upper limit. The actual center between the two bathtub edges can be identified and then the offset between the actual and corrected centers can be determined. As the read head offset value was already accounted for when the read elements of the test drive were positioned over written tracks of the test tape, the offset between the actual and corrected centers is presumed to be the write head offset value. The servo system of the test drive can then independently implement the write and read head offset values during future write and read operations to limit the effect of tape head non-idealities on writing and reading operations.

In one aspect, a method for determining read and write head placement errors in a tape drive includes first positioning at least one read element of a read head of a tape drive over a nominal center position of at least one data track of a first magnetic tape with a servo tracking system of the tape drive; first reading data from the at least one data track of the first magnetic tape with the at least one read element; first determining, from the first reading step, an actual center position of the at least one data track of the first magnetic tape; first ascertaining a read head offset value of the tape drive from the nominal center position based on the actual center position of the at least one data track of the first magnetic tape; writing at least one data track on a second magnetic tape with at least one write element of a write head of the tape drive; correcting a nominal center position of the at least one data track of the second magnetic tape with the read head offset value to obtain a corrected center position; and establishing a write head offset value of the tape drive from the corrected center position.

In one arrangement, the establishing may include second positioning at least one read element of the read head of the tape drive over the corrected center position of the at least one data track of the first magnetic tape with the servo tracking system of the tape drive; second reading data from the at least one data track of the second magnetic tape with the at least one read element; second determining, from the second reading step, an actual center position of the at least one data track of the second magnetic tape; and second ascertaining a write head offset value of the tape drive from the corrected center position based on the actual center position of the at least one data track of the second magnetic tape. In another arrangement, the method may include first utilizing, by the servo tracking system of the tape drive, the write head offset value to adjust a position of the write head of the tape drive during writing operations of the tape drive on a third magnetic tape. In another arrangement, the method may thereafter include second utilizing, by the servo tracking system of the tape drive, the read head offset value to adjust a position of the read head of the tape drive during read operations of the tape drive on the written data tracks of the third magnetic tape.

In another aspect, a tape drive includes a housing; a write head within the housing, the write head comprising a plurality of servo elements and a plurality of write elements; a read head within the housing, the read head comprising a plurality of servo elements and a plurality of read elements; a servo system that adjusts the write and read heads based on signals received from the servo elements; and a memory that stores at least one write head offset value and at least one read head offset value, wherein the servo system utilizes the at least one write head offset value to adjust a nominal write position of the write head over a magnetic tape at which to write data tracks, and wherein the servo system utilizes the at least one read head offset value to adjust a nominal center position of data tracks of the magnetic tape written by the write head over which the read head resides to read the written data tracks.

In another aspect, a system for calibrating errors in positioning tape head assembly data write and read elements includes a processing module; and a memory module logically connected to the processing module and comprising a set of computer readable instructions executable by the processing module to first read error signals as each of a plurality of data tracks of a first magnetic tape is passed by a respective plurality of read elements of a read head of a tape drive to determine respective actual center positions of each of the plurality of data tracks of the first magnetic tape in relation to respective nominal center positions of each of the plurality of data tracks of the first magnetic tape, wherein the actual and nominal center positions are measured with respect to a common reference frame, and wherein a difference between an average of the nominal center positions and an average of the actual center positions comprises a read head offset value; write a plurality of data tracks on a second magnetic tape with a respective plurality of write elements of a write head of the tape drive; position each of the plurality of read elements over respective corrected center positions of the plurality of written data tracks of the second magnetic tape, wherein each corrected center position comprises a respective nominal center position as corrected by the read head offset value; and second read error signals as each of the plurality of written data tracks of the second magnetic tape is passed by the respective plurality of read elements of the read head of the tape drive to determine respective actual center positions of each of the plurality of written data tracks of the second magnetic tape in relation to respective nominal center positions of each of the plurality of data tracks of the second magnetic tape, where the actual and nominal center positions are measured with respect to a common reference frame, and where a difference between an average of the nominal center positions and an average of the actual center positions is a write head offset value.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 2b is a simplified schematic plan view of a read head of a tape drive read data tracks from the tape of FIG. 2a.

FIG. 3a illustrates isolated, non-shingled data tracks written by a write element of the write head of FIG. 2a.

FIG. 3b illustrates shingled data tracks written by a write element of the write head of FIG. 2a, according to one embodiment.

FIG. 3d illustrates non-isolated, non-shingled data tracks written by a write element of the write head of FIG. 2a.

DETAILED DESCRIPTION

Disclosed herein are utilities that independently calibrate write head and read head positioning errors during respective write and read operations over a tape and then utilize write head and read head offset values obtained during the calibration to more accurately position the write and read heads during write and read operations to collectively account for the various types of non-idealities in the write or read head of a tape drive (e.g., positioning errors between the data write/read elements and servo readers, errors in width of data write elements, etc.). In one arrangement, a test tape drive may be operated to read the written tracks of a calibration tape (e.g., presumed to be written substantially "ideally") for purposes of determining a read head offset of the read head of the test drive. The test drive may then be used to write data tracks onto another tape (e.g., a second tape, a test tape, etc.) free of any implemented head offsets (i.e., the test tape is written just as the test drive would normally write). After writing the data tracks onto the test tape, the read head of the test drive may then be used to read the written tracks of the test tape for purposes of determining a write head offset of the write head of the test drive (as opposed to for determining the read head offset as discussed above), where the read elements of the read head are disposed over the written tracks at a position that is offset from a nominal center position of the written tracks by the read head offset. The servo system of the test drive (and of any other tape drives similar to the test drive) can then independently implement the write and read head offset values during future write and read operations to limit the effect of tape head non-idealities on writing and reading operations.

Figure 1:
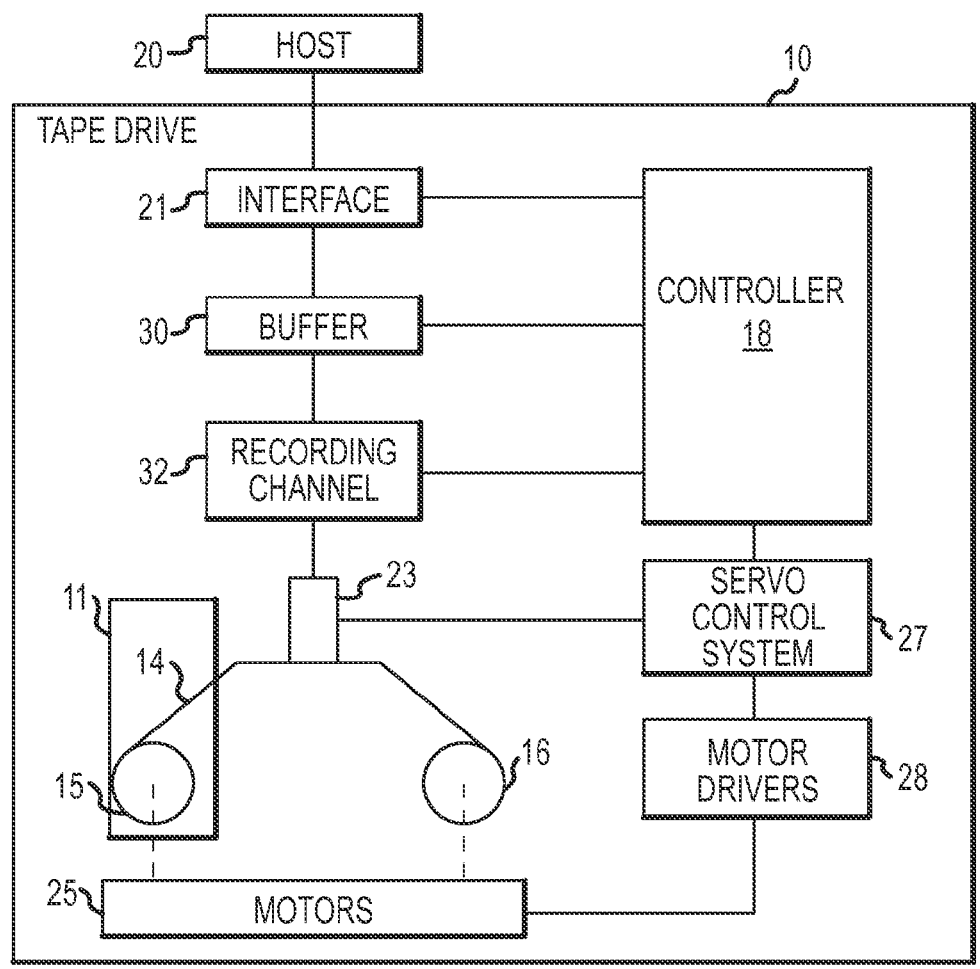
FIG. 1 is a schematic view of an exemplary tape drive that may be adapted to implement the various utilities and functionalities disclosed herein.

With reference to FIG. 1, a schematic view of an exemplary tape drive 10 and a magnetic tape cartridge 11 that may be adapted to implement the various utilities disclosed herein are illustrated, although it should be understood that numerous other forms of tape drives may be used to implement the disclosed utilities. For instance, single reel tape drives, dual reel cartridges, and the like are all envisioned as being able to implement the disclosed systems, methods and the like presented herein. In any case, the magnetic tape cartridge 11 in FIG. 1 includes a length of magnetic tape 14 (e.g., magnetic tape pack, magnetic tape media) wound on at least one reel 15. The tape drive 10 may include one or more controllers 18 of a recording system for operating the tape drive 10 in accordance with commands received from a host system 20 received at an interface 21. The tape drive 10 may be coupled to the host system 20 in a number of manners such as directly, through a library, or over a network (e.g., via Small Computer Systems Interface (SCSI), Fibre Channel Interface, and the like). The tape drive 10 may be a standalone unit or form part of a tape library or other subsystem.

The magnetic tape cartridge 11 may be inserted into the tape drive 10 and loaded by the tape drive 10 so that the tape 14 winds around a reel 16 of the tape drive 10 (e.g., in addition to one or more rollers or the like) and so that one or more read and/or write heads 23 of the recording system (e.g., collectively, a head assembly) reads and/or writes information with respect to the magnetic tape 14 as the tape is moved longitudinally in first/forward and/or second/reverse opposed directions by one or more motors 25. The magnetic tape 14 may include a plurality of parallel data tracks that may be read and/or written by the read and/or write heads 23. In some formats, the tracks may be written and/or read in a serpentine, back and forth manner; in a spiral-in manner; and the like. The recording system may include a servo control or tracking system 27 to electronically switch from one of the read/write heads 23 to another of the read/write heads 23; to seek and move the read/write heads 23 laterally relative to the magnetic tape; to position the read/write heads 23 at a desired location over the tape 14 and/or one or more tracks of the tape 14; to follow one or more desired tracks; and/or the like. The various components of the tape drive 10 may be incorporated or otherwise embodied within any appropriate housing (not shown).

In some arrangements, the magnetic tape 14 may include physical and logical tracks, where the various tracks of the tape 14 may be identified (e.g., numbered) according to their physical location between first and second lateral edges of the tape, and where the various tracks of the tape 14 may also be identified according to the order in which the tracks were written. For instance, one of the physical tracks in the middle of the tape 14 may in some formats actually be the first track written on the magnetic tape 14 and thus the first logical tracks of the magnetic tape 14. The servo control system 27 may also control the operation of the motors 25 through motor drivers 28 in response to instructions by the one or more controllers 18, where the controllers 18 may provide the data flow and formatting of data to be read from and written to the magnetic tape 14 (e.g., via employing a buffer 30 and a recording channel 32).

Figure 2A:
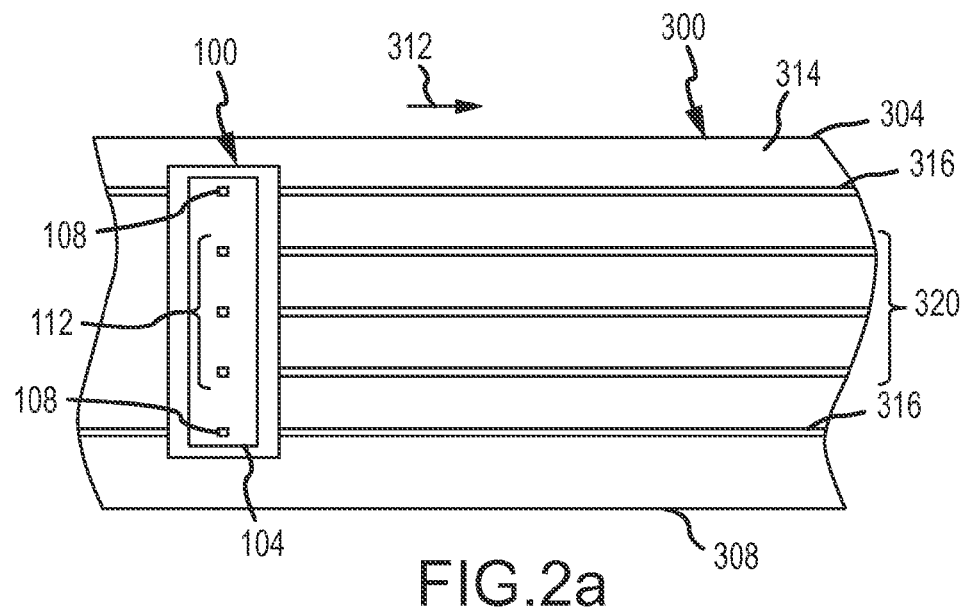
FIG. 2a is a simplified schematic plan view of a write head of a tape drive writing data tracks to a tape.
Figure 2B:
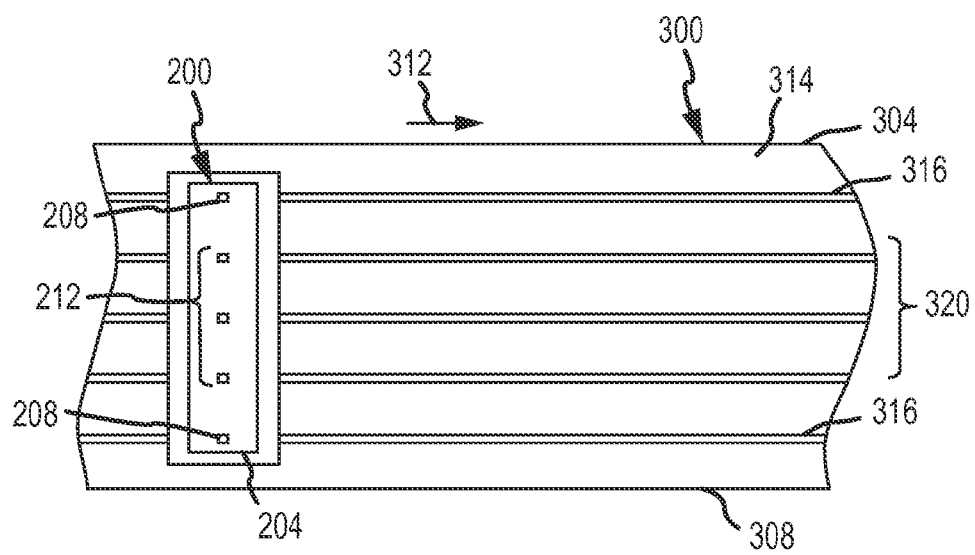

Turning now to FIGS. 2a-2b, simplified schematic plan views of a write head 100 and a read head 200 of the tape drive (e.g., tape drive 10 of FIG. 1) respectively writing and reading data tracks of a magnetic tape 300 (e.g., tape 14 of FIG. 1) are illustrated (which are not necessarily drawn to scale for purposes of clarity). More specifically, FIG. 2a illustrates the magnetic tape 300 moving under (or over) the write head 100 in a first direction 312 so that the write head 100 can write a plurality of data tracks 320 onto a surface 314 of the tape 300 between first and second lateral edges 304, 308 of the tape 300 in any appropriate manner. As shown, the write head 100 may include a plurality of write elements 112 (e.g., 16, 32, etc.) each of which is configured to write a respective one of the data tracks 320. The various write elements 112 may be appropriately disposed on a "bump" 104 of the write head 100 along with one or more servo read elements 108 that are configured to read corresponding servo patterns 316 on the surface 314 of the tape 300. Any appropriate servo control system (e.g., servo control system 27 of FIG. 1) of the tape drive may utilize information received from the servo read elements 108 as the servo read elements 108 are reading the servo patterns 316 for purposes of maintaining alignment of the write elements 112 over desired locations or positions on the tape 300. Each time the plurality of write elements 112 write respective data tracks 320 along the surface 314 of the tape 300 with the tape 300 moving in the first direction 312 (or in an opposed second direction) may be considered a "wrap."

FIG. 2b illustrates the tape 300 moving under (or over) the read head 200 in the first direction 312 so that the read head 200 can read the plurality of data tracks 320 from the surface 314 of the tape 300 in any appropriate manner. As shown, the read head 200 may include a plurality of read elements 212 (e.g., 16, 32, etc.) each of which is configured to read a respective one of the data tracks 320. The various read elements 212 may be appropriately disposed on a "bump" 204 of the read head 200 along with one or more servo read elements 208 that are configured to read the corresponding servo patterns 316 on the surface 314 of the tape 300. Again, the servo control system of the tape drive may utilize information received from the servo read elements 208 as the servo read elements 208 are reading the servo patterns 316 for purposes of maintaining alignment of the read elements 212 over the corresponding data tracks 320 on the tape 300.

Each of the write elements 112 of the write head 100 may be configured to write a plurality of data tracks 320 along the surface 314 of the tape 300 in any appropriate manner. In one arrangement, and with reference to FIG. 3a, each write element 112 may be configured to write a plurality of isolated data tracks $320_1$, $320_2$, $320_3$ (i.e., data tracks 320 that do not overlap and/or contact other ones of the data tracks 320). In other arrangements, each write element 112 may shingle the respective data tracks 320 that it writes so as to achieve higher track densities and the like. For instance, FIG. 3b illustrates one embodiment where data track $320_2$ partially overlaps data track $320_1$, data track $320_3$ subsequently partially overlaps data track $320_2$, and so on. Each data track 320 includes a physical width 324 extending between first and second physical lateral edges 328, 332 of the data track 320 (e.g., where the physical width generally corresponds to a width of the respective write element 112) as well as a physical centerline 336 between the first and second physical lateral edges 328, 332.

Furthermore, each data track 320 includes a residual width 340 extending between the first lateral edge 328 of the data track 320 (e.g., data track $320_2$) and the first lateral edge 328 of an adjacent subsequently written data track 320 (e.g., data track $320_3$) and a residual centerline 344 between the first lateral edge 328 of the data track 320 and the first lateral edge 328 of the adjacent subsequently written data track 320. As shown, the residual centerline 344 may be offset from the physical centerline 336. In any case, each data track 320 may include a written track portion along the physical width 324 and a residual track portion along the residual width 340, where a read element 212 of the tape drive reads data from the residual track portions of each of the data tracks 320 under control of the servo control system.

Figure 3C:
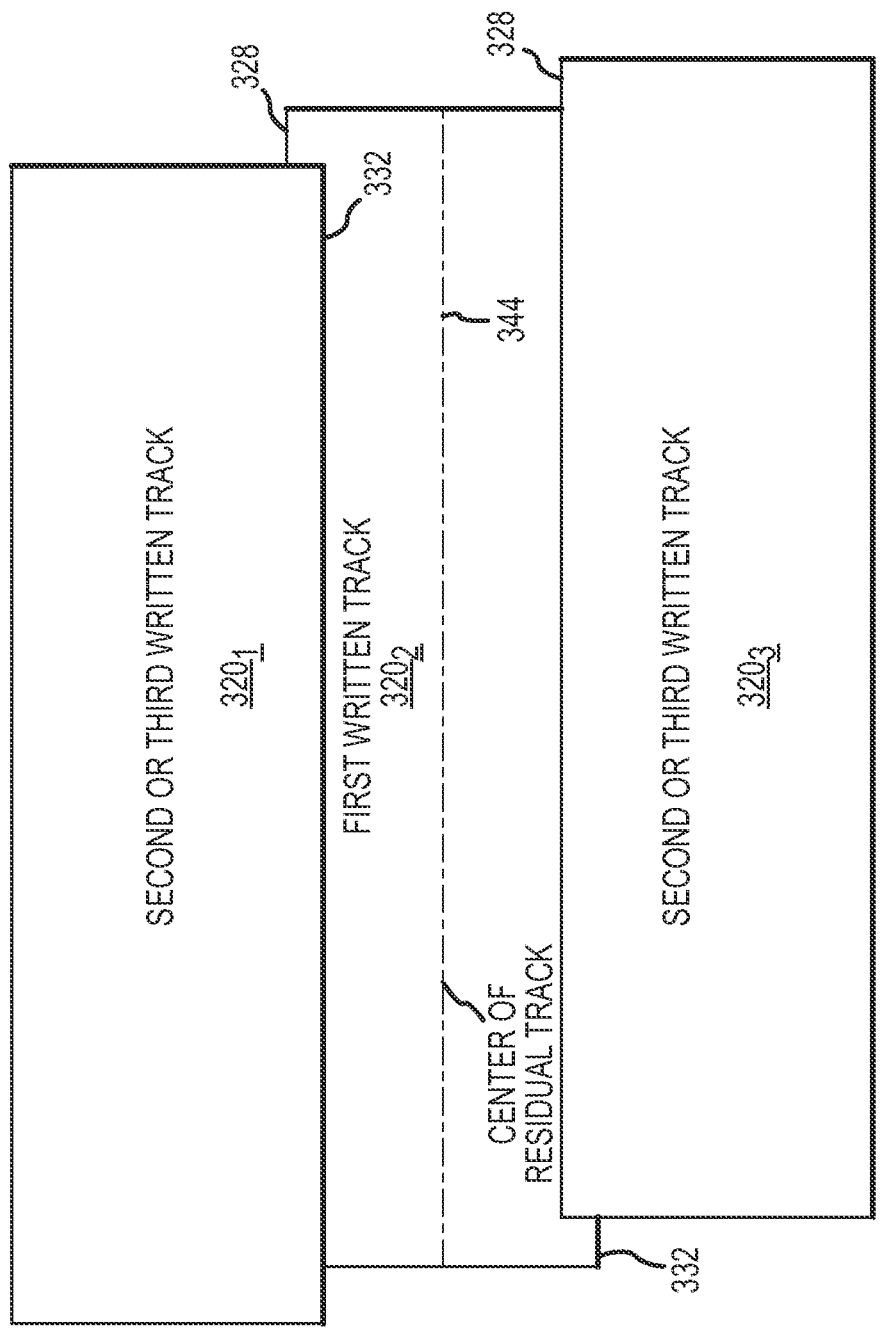
FIG. 3c illustrates shingled data tracks written by a write element of the write head of FIG. 2a, according to another embodiment.

As another example, FIG. 3c illustrates an embodiment where data track $320_2$ is written first, and then data tracks $320_1$ and $320_3$ are respectively subsequently written to overlap the first and second lateral edges 328 of data track $320_2$. In this regard, the residual width (not shown in FIG. 3c) of data track $320_2$ extends between the second lateral edge 332 of data track $320_1$ and the first lateral edge 328 of data track $320_3$, where the residual centerline 344 is located between the second lateral edge 332 of data track $320_1$ and the first lateral edge 328 of data track $320_3$ (and where the residual centerline 344 coincides with the physical centerline (not shown in FIG. 3c)). FIG. 3d illustrates an embodiment where data tracks $320_1$ and $320_3$ are initially written in an isolated manner and then data track $320_2$ is subsequently written to as to overlap the second lateral edge 332 of data track $320_1$ and the first lateral edge 328 of data track $320_3$. In this regard, while data track $320_2$ has been shingled over data tracks $320_1$ and $320_3$, data track $320_2$ itself has not been shingled over or otherwise overlapped. Thus, residual centerline 344 of data track $320_2$ is the same as the physical centerline (not shown in FIG. 3d), as are the physical and residual widths (not shown in FIG. 3d).

Regardless of the manner in which the data tracks 320 are written by the write elements 112 of the write head 100, each read element 212 of the read head 200 should ideally line up with or otherwise be positioned over the residual centerline 344 (e.g., or physical centerline 336 when the tracks 320 are not shingled) of a corresponding data track 320 during read operations of the tape drive. However, various types of track misregistration errors often exist that limit the degree to which the read elements 212 may accurately align with respective data tracks 320. Stated differently, various types of errors, inefficiencies, non-idealities and the like result in the "nominal" centerline of a particular data track 320 (i.e., the location over the particular residual track portion of a data track at which the servo control system of a tape drive ascertains or presumes the residual centerline to be) being different than the actual (e.g., residual) centerline of the particular data track 320 (e.g., different than the residual centerline 344 of the data track 320). Furthermore, such errors, inefficiencies, non-idealities and the like can result in the write elements of a write head writing data tracks at locations over a tape ("nominal write locations") that are different than those from which the servo control system subsequently attempts to read and the like.

As an example, mask alignment errors may exist in relation to the position of the servo read elements 108 relative to the write elements 112 (e.g., due to the physical positions of these components being defined on different mask layers), errors in the width of the write elements 112 (e.g., which can cause shifts in the track centerline when shingling), errors between the magnetic and physical centerlines of each of the servo readers 108/208, write elements 112, and read elements 212, and the like. As another example, the write elements 112 of different tape drives can sometimes have different write widths and may thus be configured to write data tracks 320 having different physical widths 332. When the write elements 112 of such different tape drives are used to write data onto the same tape 300, the first lateral edges 328 of data tracks 320 that are intended to be written along a same lateral location over the surface 314 of the tape 300 between the first and second lateral edges 304, 308 of the tape 300 may in fact differ which may lead to errors during subsequent reading operations.

Figure 4:
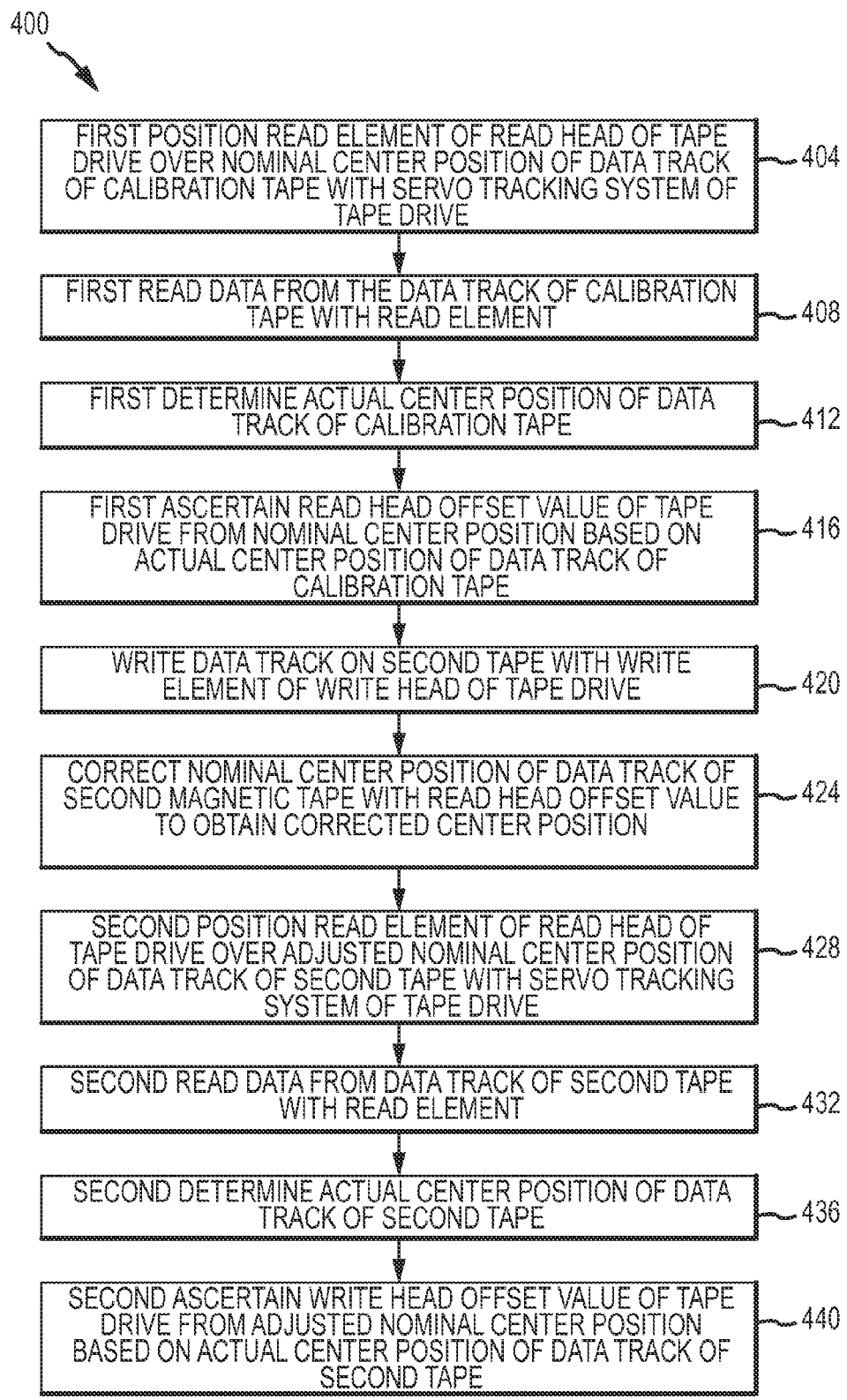
FIG. 4 is a flow diagram of a method of calibrating write head and read head positioning errors during respective write and read operations over a tape to collectively account for various types of non-idealities in the write or read head of a tape drive.

Turning now to FIG. 4, a flow diagram of a method 400 is illustrated that determines a degree (e.g., amount, such as in nanometers) to which each of the write elements of a write head of a tape drive needs to be laterally offset (e.g., via laterally offsetting the entire write head) from a nominal write position of the write elements over a tape as determined by a servo control system to subsequently allow for more accurate and efficient reading of the data tracks by read elements of the tape drive for purposes of collectively accounting for (e.g., limiting the negative effects of) the various types of the aforementioned errors, inefficiencies, non-idealities and the like. The method 400 also determines a degree (e.g., amount, such as in nanometers) to which each of the read elements of a read head of the tape drive needs to be laterally offset (e.g., via laterally offsetting the entire read head) from a nominal centerline of each of the various respective data tracks to be read by the read elements as determined by the servo control system (e.g., where the nominal centerline is a position over each of the various data tracks at which the servo control system would otherwise determine the residual centerline allegedly resides) to more accurately read the data tracks for collectively accounting for the various types of the aforementioned errors, inefficiencies, non-idealities and the like. The degree to which the read elements need to be offset from the nominal centerline of the data tracks may be different than the degree to which the write elements need to be offset from the nominal desired position over the tape.

At 404, the method 400 may include first positioning at least one read element of a read head of a tape drive over a nominal center position of at least one data track of a first magnetic tape with a servo tracking system of the tape drive. In one arrangement, the first magnetic tape may be considered a "calibration" tape including tracks that are previously determined to be written, positioned and spaced on the tape substantially ideal, perfect, and/or the like. Turning to FIGS. 1, 2b and 3b, for instance, the servo control system 27 of the tape drive 10 may utilize signals received from the servo readers 208 while following the servo patterns 316 to position the various read elements 212 over nominal centerlines 348 (e.g., nominal center positions) of each of the respective data tracks 320 of the first magnetic tape 300. While the nominal centerline 348 of data track $320_2$ is show in FIG. 2b, it is to be understood that each write element 212 may be positioned over nominal centerlines 348 of other data tracks 320 which may or may not be shingled.

In any event, the nominal centerline 348 may in some situations be offset or spaced from the actual, residual centerline 344 by a gap or offset 352 (hereinafter referred to as the "read head offset" or "read head offset value") due to various inefficiencies and non-idealities as discussed herein (at least some of which are static errors). See FIG. 3b. Thus, it may be desirable to quantify or otherwise determine the amount or value of the read head offset 352 and use the same during future reading operations by the tape drive 10 (as positioning each read head 212 closer to the actual residual centerline 344 may increase the accuracy of data obtained during the reading operations). As shown in FIG. 4, the method 400 may include first reading data 408 from the at least one data track of the first magnetic tape with the at least one read element; first determining 412, from the first reading 408, an actual center position of the at least one data track of the first magnetic tape; and first ascertaining 416 a read head offset value of the tape drive from the nominal center position based on the actual center position of the at least one data track of the first magnetic tape.

One manner in which the actual, residual centerline 344 of the data track $320_2$ may be determined for purposes of determining the read head offset is by performing a "bathtub" read of the data track $320_2$. As part of a bathtub read, for instance, the tape 300 may be moved in the first direction 312 (e.g., or in the opposed second direction) with the at least one read element 212 over the nominal centerline 348 and data may be read by the at least one read element 212. As part of the reading of data, any appropriate error metrics may be ascertained (e.g., block error rate (BLER), signal-to-noise ratio (SNR), raw amplitude, overwrite measurement, etc.) in any appropriate manner. When the ascertained error metrics are below (or alternatively, in some arrangements, above) some threshold value, percentage, etc., the current position of the at least one read element 212 is presumed to still be within the residual width 340 of the particular data track $320_2$.

Accordingly, the servo control system 27 may be utilized to repeatedly position the at least one read element 212 (e.g., via moving the entire read head 200) at lateral positions away from the nominal centerline 348 and obtain corresponding error metrics in association with the reading of data at least of such lateral positions until the error metrics reach or exceed the threshold value, percentage, etc. (i.e., a plurality of reads of the data track $320_2$ may be performed at positions farther and farther away from the nominal centerline 348). The positions on each of the first and second opposed lateral sides of the nominal centerline 348 at which the error metrics have reached or exceeded the threshold may be considered the bathtub or outer edges of the residual portion of the data track $320_2$ (e.g., which may correspond to the first lateral edge 328 of data track $320_2$ and the first lateral edge 328 of data track $320_3$ in FIG. 3b). Once the two bathtub edges of the data track $320_2$ are identified, the actual, residual centerline 344 can be determined (e.g., halfway between the first lateral edge 328 of data track $320_2$ and the first lateral edge 328 of data track $320_3$ in FIG. 3b), and then the read head offset 348 can be determined by obtaining the difference the nominal centerline 348 and the actual, residual centerline 344.

Figure 5:
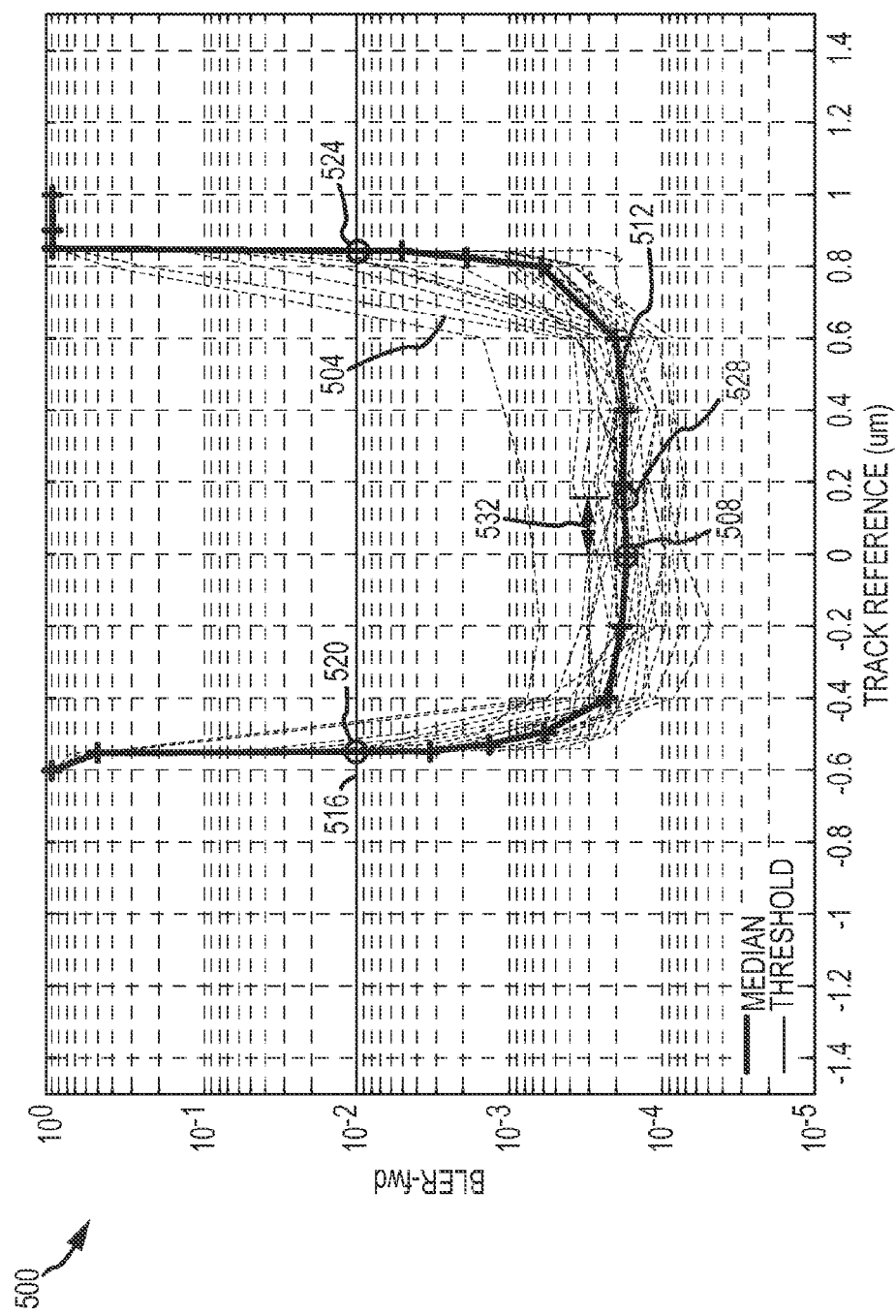
FIG. 5 is an exemplary plot of BLER versus data track reference location for each of a plurality of read elements of a read head of a tape drive during a bathtub read test of a magnetic tape.

FIG. 5 presents an exemplary plot or chart 500 of BLER versus data track reference location (e.g., in micrometers) for each of a plurality of read elements (e.g., read elements 212) of a read head (e.g., read head 200) of a tape drive (e.g., tape drive 10) during a bathtub read test of a tape (e.g., tape 300). More specifically, the track reference location 508 of "0" generally corresponds to a nominal centerline (e.g., nominal centerline 348) of each of a plurality of corresponding data tracks 320 being read by the read elements 212 (where each dotted line 504 corresponds to a single read element 212 reading a single corresponding data track 320). It can be seen how the BLER generally increases at track reference locations farther and farther away from the nominal centerline of each of the data tracks (where the "track reference" axis of the chart 500 represents a common reference frame for all of the data tracks). To account for all of the read elements 212 of the tape drive, an average (e.g., mean, median) line 512 may be identified that is collectively representative of all of the dotted lines 504.

A threshold BLER 516 may be determined or otherwise obtained in any appropriate manner and first and second track reference locations 520, 524 at which the average line 512 reaches or exceeds the threshold BLER 516 may be identified (e.g., corresponding to the first lateral edge 328 of data track $320_2$ and the first lateral edge 328 of data track $320_3$ in FIG. 3b). A track reference location 528 that is substantially (e.g., almost exactly) halfway between the first and second track reference locations 520, 524 may be identified (which may correspond to the actual, residual centerline 344 in FIG. 3b) and then a difference 532 between the track reference location 508 and the track reference location 528 may be ascertained and equated to the read head offset (e.g., read head offset 352) of the tape drive.

Once the read head offset has been ascertained, the method 400 of FIG. 4 may include writing 420 at least one data track on a second magnetic tape (e.g., a "test" tape) with at least one write element of a write head of the tape drive. That is, the same tape drive used in steps 404, 408, 412 and 416 of the method 400 is now used to write 420 data onto a second/test tape that is different than the first (calibration) tape. For instance, the servo control system 27 of the tape drive 10 may utilize signals received from the servo read elements 108 of the write head 100 to position the various write elements 112 at any appropriate lateral positions over the second tape ("nominal write locations" or "nominal write positions") and then write a corresponding plurality of data tracks 320 with the write elements 112 over the nominal write locations in any appropriate manner (e.g., isolated tracks, shingled tracks, non-shingled tracks, etc.).

The method 400 also includes a step 424 of correcting a nominal centerline of the at least one data track of the second magnetic tape with the (previously determined or obtained) read head offset value to obtain a corrected centerline of the data track (where the corrected centerline is closer to the actual residual centerline of the data track than is the nominal centerline). Stated differently, the correcting step 424 includes determining a position over the data track that is offset from the nominal centerline by the read head offset value. With reference to FIG. 3b, and assuming data track $320_2$ now represents a data track on the second magnetic tape, the step 424 may include adding (or subtracting) the read head offset 352 to (or from) the nominal centerline 348 to obtain a lateral position of the actual, residual centerline 344 (e.g., a "corrected centerline" or "corrected center position").

The method 400 may include second positioning 428 the read elements 212 of the read head 200 of the tape drive 10 over the corrected centerlines of each of the respective data tracks 320 of the second magnetic tape with the servo tracking system of the tape drive (e.g., via movement of the entire read head 200); second reading data 432 from the data tracks 320 of the second magnetic tape with read elements 212; second determining 436, from the second reading 432, an actual, residual centerline of the data tracks of the second magnetic tape; and second ascertaining 440 an offset value from the corrected centerline based on the actual, residual centerline of the data tracks of the second magnetic tape, where, for instance, a bathtub read of the data tracks of the second magnetic tape may be performed as discussed previously to identify the offset value. It is noted how the offset value between the actual and corrected centerlines is presumed to be the write head offset for this tape drive as the read head offset value for this tape drive was already accounted for when the read elements of the tape drive were positioned over the written tracks of the second magnetic tape.

While the correcting step 424 and the resulting corrected center position have been illustrated and described in some embodiments as being performed and implemented before steps 428, 432, 436, and 440, other embodiments envision that the correcting step 424 and/or the resulting corrected center position may be performed and/or implemented after one or more of these steps. For instance, one embodiment includes second positioning the read element over the nominal center position (instead of over corrected center position) of the data track (written in step 420) of the second tape in step 428, second reading data in step 432, second determining the actual center position in step 436, second ascertaining a "preliminary" write head offset value in step 440, and then third ascertaining an "actual" write head offset value from the preliminary write head offset value based on the corrected center position.

Once the write and read head offset values have been determined, the values can be used during future writing and reading operations with the tape drive (or with other tape drives similar to the tape drive in relation to configuration of write heads, read heads, etc.) on any appropriate magnetic tape. In one arrangement, the values can be stored in a memory (e.g., flash, etc.) of the tape drive 10 (e.g., associated with controller 18 and/or servo control system 27) and loaded for future operations. For instance, the servo control system 27 of the tape drive 10 may utilize the write head offset to adjust a nominal write position of each of the write elements 112 over a third magnetic tape (where the nominal write position is the position at which the servo control system would naturally determine the write elements 112 are to otherwise be positioned in the absence of the disclosed write head offset); position the write elements 112 over the adjusted nominal write positions (e.g., via moving the entire write head 112); and write, with the write elements 112 of the write head 100 positioned over the adjusted nominal write positions, data tracks to the third magnetic tape. When the written data tracks are to be read back by the tape drive, the servo control system 27 may utilize the read head offset to correct a nominal centerline of each of the written tracks of the third magnetic tape; position the read elements 212 over the corrected centerline (e.g., via moving the entire read head 212); and read, with the read elements 212 of the read head 200 positioned over the corrected centerlines, data tracks from the third magnetic tape.

In one arrangement, the determined write and read head offsets may be implemented (e.g., during subsequent writing and reading operations) in a mutually exclusive manner. For instance, the servo control system 27 of the tape drive 10 may implement the write head offset at the write head 100 as the write elements 112 write data tracks 320 on the tape 300 as the tape 300 moves in the first direction 312. After the tape 300 has been appropriately rewound, the servo control system 27 of the tape drive 10 may implement the read head offset at the read head 200 as the read elements 212 read the written data tracks 320 from the tape 300 as the tape 300 moves in the first direction 312. This arrangement may advantageously be implemented when the write and read heads form a part of a common head assembly, where movement of the common head assembly induces corresponding movement of each of the write and read heads 112, 212.

In another arrangement, the determined write and read head offsets may be implemented (e.g., during subsequent writing and reading operations) substantially simultaneously. As an example, some tape drives utilize a read head to read data tracks substantially immediately after the data tracks are written by a write head of the tape drives. Stated differently, the write and read heads of a tape drive may respectively write and read data tracks at the same time (e.g., for purposes of verifying the integrity of the written data tracks). In this regard, the servo control system may simultaneously position the write elements of the write head over the corrected write positions (i.e., the nominal write positions as corrected by the write head offset) and the read elements of the read head over the corrected centerline (i.e., the nominal centerline as corrected by the read head offset). For instance, the servo control system may respectively adjust (e.g., position, actuate, etc.) each of the write and read heads independently of the other in any appropriate manner (e.g., in the case where the write and read heads are not rigidly or non-movably secured to a common head assembly). Even in the case where the write and read heads are rigidly or non-movably secured to a common head assembly, the common head assembly may still be able to independently implement the write and read head offsets during respective (e.g., simultaneous) writing and reading operations in the event that the common head assembly includes at least two degrees of freedom (e.g., slide and tilt).

It will be readily appreciated that many additions and/or deviations may be made from the specific embodiments disclosed in the specification without departing from the spirit and scope of the invention and that the illustrations and discussion herein has only been provided to assist the reader in understanding the various aspects of the present disclosure. For instance, the accuracy and effectiveness of the write and read head offsets disclosed herein may be verified by writing data to and then reading the written data from the second/test tape, where the writing and reading include use of the write and read head offsets disclosed herein, and confirming as part of the reading (e.g., via a bathtub test) that the offset is nearly zero microns or the like. Furthermore, one or more various combinations of the above discussed arrangements and embodiments are also envisioned.

Embodiments disclosed herein can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a non-volatile memory device, a composition of matter affecting a machine-readable propagated signal, or a combination of one or more of them. In this regard, the host 20, tape drive 10, and the like may encompass one or more apparatuses, devices, and machines for processing data, including by way of example a programmable processor, a computer, or multiple processors or computers. In addition to hardware, the host 20, tape drive 10, and the like may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described herein (e.g., reading data, writing data, and the like) can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification (e.g., the method 400 of FIG. 4) can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A method for determining read and write head placement errors in a tape drive, comprising:
   first positioning at least one read element of a read head of a tape drive over a nominal center position of at least one data track of a first magnetic tape with a servo tracking system of the tape drive;
   first reading data from the at least one data track of the first magnetic tape with the at least one read element;
   first determining, from the first reading step, an actual center position of the at least one data track of the first magnetic tape;
   first ascertaining a read head offset value of the tape drive from the nominal center position based on the actual center position of the at least one data track of the first magnetic tape, wherein the read head offset value is the difference between the nominal center position and the actual center position;
   writing at least one data track on a second magnetic tape with at least one write element of a write head of the tape drive;
   correcting a nominal center position of the at least one data track of the second magnetic tape with the read head offset value to obtain a corrected center position; and
   establishing a write head offset value of the tape drive from the corrected center position.

2. The method of claim 1, wherein the establishing step comprises:
   second positioning at least one read element of the read head of the tape drive over the corrected center position of the at least one data track of the second magnetic tape with the servo tracking system of the tape drive;
   second reading data from the at least one data track of the second magnetic tape with the at least one read element;
   second determining, from the second reading step, an actual center position of the at least one data track of the second magnetic tape; and
   second ascertaining a write head offset value of the tape drive from the corrected center position based on the actual center position of the at least one data track of the second magnetic tape.

3. The method of claim 1, further comprising:
   first utilizing, by the servo tracking system of the tape drive, the write head offset value to adjust a position of the write head of the tape drive during writing operations of the tape drive on a third magnetic tape.

4. The method of claim 3, wherein the first utilizing step comprises:
   correcting a nominal write position on the third magnetic tape at which at least one data track is to be written with the write head offset value to obtain a corrected write position;
   positioning the write head over the corrected write position; and
   writing, with the write head positioned over the corrected write position, data tracks to the third magnetic tape.

5. The method of claim 4, wherein the correcting the nominal write position step comprises:
   adding the write head offset value to the nominal write position; or
   subtracting the write head offset value from the nominal write position.

6. The method of claim 3, further comprising:
   second utilizing, by the servo tracking system of the tape drive, the read head offset value to adjust a position of the read head of the tape drive during read operations of the tape drive on the written data tracks of the third magnetic tape.

7. The method of claim 6, wherein the second utilizing step comprises:
   correcting a nominal center position of at least one of the written data tracks of the third magnetic tape with the read head offset value to obtain a corrected center position;
   positioning the read head over the corrected center position; and
   reading, with the read head positioned over the corrected center position, the at least one written data track from the third magnetic tape.

8. The method of claim 7, wherein the correcting the nominal center position step comprises:
   adding the read head offset value to the nominal center position; or
   subtracting the read head offset value from the nominal center position.

9. The method of claim 6, wherein the first utilizing step and second utilizing step occur substantially simultaneously.

10. The method of claim 9, wherein the respective positions of the write and read heads of the tape drive are independently adjustable.

11. The method of claim 1, further comprising:
   establishing, by the servo tracking system, the nominal center positions of data tracks of the first and second magnetic tapes.

12. The method of claim 11, wherein the establishing step comprises:
reading, by at least one servo element of the read head, at least one servo track of the first and second magnetic tapes; and
using data obtained during the servo element reading step to establish the nominal center positions of the data tracks of the first and second magnetic tapes.

13. The method of claim 1, wherein each of the first and second reading data steps comprises:
performing a plurality of reads of the at least one data track by the at least one read element on opposing sides of the nominal center position of the at least one data track to identify outer edge positions of the at least one data track.

14. The method of claim 13, wherein each of the first and second determining steps comprises:
identifying a center position between the outer edge positions of the at least one data track, wherein the actual center position of the at least one data track is the identified center position.

15. The method of claim 14, wherein the performing step occurs for each of a plurality of data tracks by a respective plurality of read elements of the read head of the tape drive, wherein the identifying step occurs for each of the plurality of data tracks, wherein all of the identified center positions are in relation to a common reference frame, and wherein the actual center position comprises a median or mean of the identified center positions of the plurality of data tracks.

16. The method of claim 14, wherein the plurality of data tracks are shingled.

17. A tape drive, comprising:
a housing;
a write head within the housing, the write head comprising a plurality of servo read elements and a plurality of write elements;
a read head within the housing, the read head comprising a plurality of servo read elements and a plurality of read elements;
a servo system that adjusts the write and read heads based on signals received from the servo read elements; and
a memory that stores at least one write head offset value and at least one read head offset value, wherein the servo system utilizes the at least one write head offset value to adjust a nominal write position of the write head over a magnetic tape at which to write data tracks, and wherein the servo system utilizes the at least one read head offset value to adjust a nominal center position of data tracks of the magnetic tape written by the write head over which the read head resides to read the written data tracks.

18. The tape drive of claim 17, wherein write and read heads are independently and simultaneously adjustable.

19. A system for calibrating errors in positioning tape head assembly data write and read elements, comprising:
a processing module; and
a memory module logically connected to the processing module and comprising a set of computer readable instructions executable by the processing module to:
first read error signals as each of a plurality of data tracks of a first magnetic tape is passed by a respective plurality of read elements of a read head of a tape drive to determine respective actual center positions of each of the plurality of data tracks of the first magnetic tape in relation to respective nominal center positions of each of the plurality of data tracks of the first magnetic tape, wherein the actual and nominal center positions are measured with respect to a common reference frame, and wherein a difference between an average of the nominal center positions and an average of the actual center positions comprises a read head offset value;
write a plurality of data tracks on a second magnetic tape with a respective plurality of write elements of a write head of the tape drive;
position each of the plurality of read elements over respective corrected center positions of the plurality of written data tracks of the second magnetic tape, wherein each corrected center position comprises a respective nominal center position as corrected by the read head offset value; and
second read error signals as each of the plurality of written data tracks of the second magnetic tape is passed by the respective plurality of read elements of the read head of the tape drive to determine respective actual center positions of each of the plurality of written data tracks of the second magnetic tape in relation to respective nominal center positions of each of the plurality of data tracks of the second magnetic tape, wherein the actual and nominal center positions are measured with respect to a common reference frame, and wherein a difference between an average of the nominal center positions and an average of the actual center positions comprises a write head offset value.

20. The system of claim 19, wherein the computer readable instructions are further executable by the processing module to:
first utilize the write head offset value to adjust a position of the write head of the tape drive during writing operations of the tape drive on a third magnetic tape; and
second utilize the read head offset value to adjust a position of the read head of the tape drive during read operations of the tape drive on the written data tracks of the third magnetic tape.

* * * * *